Jan. 18, 1955 A. VORMS 2,700,066

TELEVISION TRANSMITTER FOR USE WITH LOW ILLUMINATION

Filed Oct. 19, 1949

INVENTOR:
ARMAND VORMS
BY Bailey, Stephens & Huettig
ATTORNEYS

United States Patent Office 2,700,066

Patented Jan. 18, 1955

2,700,066

TELEVISION TRANSMITTER FOR USE WITH LOW ILLUMINATION

Armand Vorms, Paris, France, assignor to Societe Nouvelle de L'Outillage R. B. V. et de la Radio-Industrie (R. B. V.-R. d.), Paris, France, a joint-stock company Application October 19, 1949, Serial No. 122,202

Claims priority, application France October 26, 1948

2 Claims. (Cl. 178—7.1)

The present invention relates to television transmission systems and more especially but not exclusively with such systems to be used under low illumination conditions of the scene to be transmitted.

Its chief object is to provide a method and apparatus of this kind which are better adapted to meet the requirements of practice than those used up to this time and, in particular, which enable an airplane to transmit television pictures at twilight and even by night.

According to my invention, the photosensitive target of a pickup tube having a substantial capacity of electron accumulation is left unscanned between two consecutive frame scannings for a time corresponding to a whole number of times the duration of the period of these frame scannings.

Other features of my invention will appear in the course of the following description of a specific embodiment thereof with reference to the accompanying drawings, given merely by way of example, and in which.

According to my invention, I make use of a pickup tube including a photosensitive target on which the optical image of the scene to be transmitted is projected, this target having a substantial capacity of electronic accumulation which enable the respective elements thereof to be electrically charged during the periods between two successive passings of the electronic scanning beam.

As above stated, my invention consists essentially in making the time interval between every two successive frame scannings thereof equal to a multiple of the duration of every frame scanning.

It will be understood that, in these conditions, the elements of the photosensitive target can be charged more than in the case of a continuous scanning of the images. It will even be advantageous to provide means for varying the number of elementary scannings to be suppressed, according to the invention, between two successive frame scannings. Thus it will be possible to have the photosensitive elements of the target charged to the desirable maximum before being subjected to the electronic scanning intended to analyze said target.

If it is supposed, for instance, that the frame scanning period is $t_0$ equal to $\frac{1}{50}$ second, scanning may be stopped, after a first elementary scanning AB (Fig. 1), for a time BC equal to a whole number $n$ of fiftieths of a second, before allowing a new scanning CD to take place.

Besides, number $n$ may be increased in a substantial manner if the televised object moves but little. In the case of observation planes which are to transmit through television the image of the ground, this will generally be the case. If necessary, in this case, mechanical or optical means will be further provided for keeping the television camera in a fixed direction toward the ground, despite the movement of the airplane. In this way, it will be possible to make use for instance of elementary scannings of a duration of $\frac{1}{50}$ second at the rate of one per second, or even less.

Figure 2:
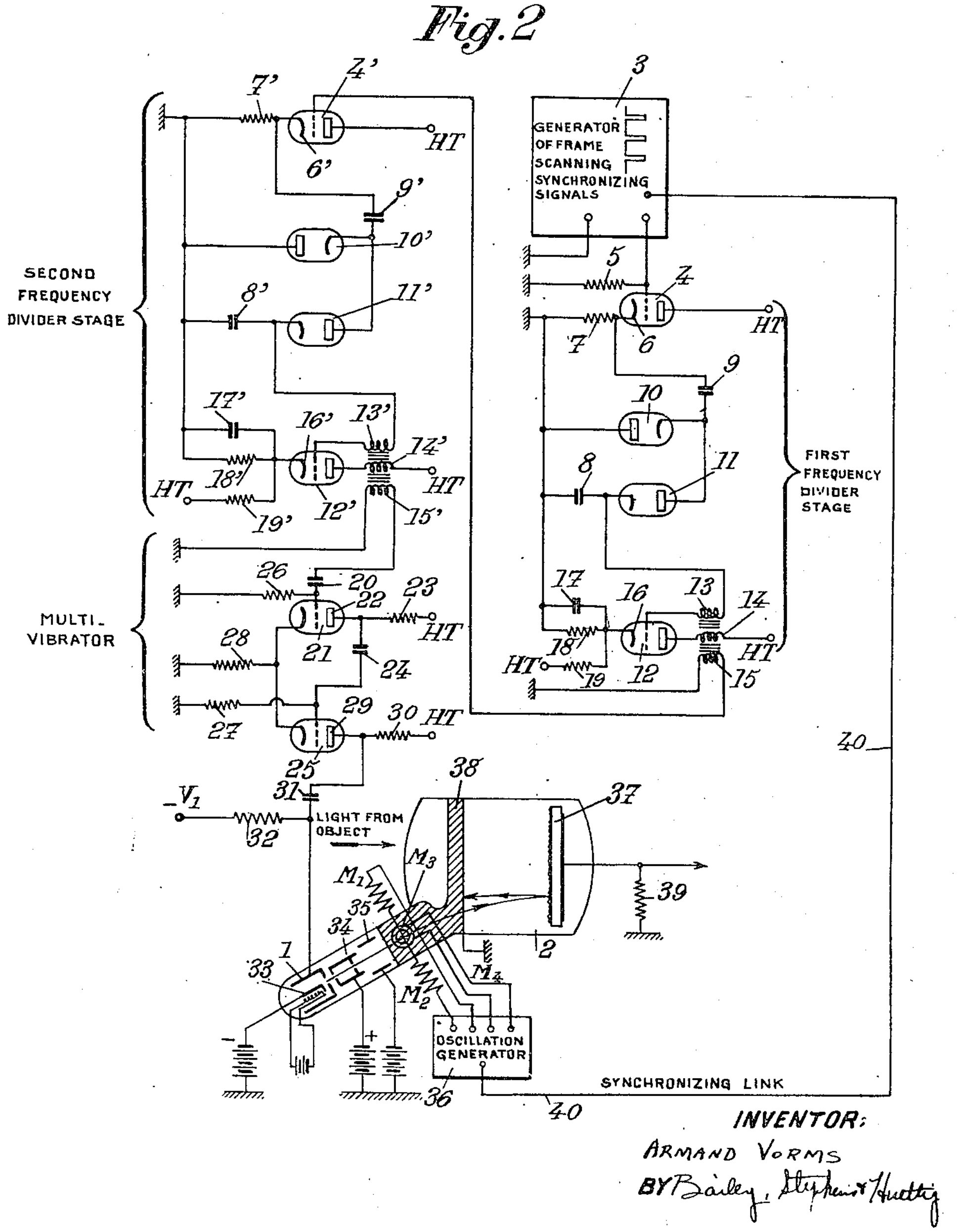
Fig. 2 is a lay-out of a device for producing such a scanning.

Fig. 2 shows, by way of example, the lay-out of a device for suppressing scanning during the desired periods and restoring it periodically for the time of a frame scanning.

According to the arrangement of Fig. 2, I apply to the Wehnelt electrode 1 of a pickup tube 2 of the type above mentioned a high negative bias voltage $V_1$, whereby the scanning electron beam is normally stopped.

In the embodiment shown by the drawing, this tube 2 is of the known type including, in an evacuated envelope, the following elements: a signal plate 37, an earthed collector 38, and an electron gun including a cathode 33 internally heated, a Wehnelt or control electrode 1, and accelerating and focusing electrodes 34 and 35. The cathode beam issued from the electron gun strikes signal plate 37 and gives rise to secondary electrons that are caught by the collector electrode 38. Said beam is deflected horizontally and vertically by the conjugate magnetic fields of two pairs of deflection coils, $M_1M_2$ and $M_3M_4$ fed from an oscillation generator 36 controlled by the frame synchronizing signals transmitted from generator 3 through link 40. Said oscillation generator comprises the frequency multiplying stages which deliver the line scanning current. The Wehnelt electrode 1 is intermittently subjected to the action of a periodical positive signal supplied by a multivibrator in step with the frame scanning control means to deliver signals at a frequency which is a sub-multiple of that of said control means. Thus, during the duration of the signal of the multivibrator, the potential of the Wehnelt electrode rises to a value which permits normal operation of the pickup tube scanning means.

Generator 3, which gives the rectangular wave form signals transmitted to oscillation generator 36 acts through a positive signal on the grid of a cathode follower tube circuit 4. A leakage resistance 5 is connected to said grid. The plate of tube 4 is connected to the positive high voltage HT, whereas cathode 6 is earthed through a resistance 7. The signal developed across resistance 7 charges a condenser 8 through another condenser 9 and two diodes 10 and 11 mounted inversely in parallel.

Every signal that reaches the grid of tube 4 thus increases the charge of condenser 8 up to a critical value which triggers an impulse into a tube 12 used as a blocked oscillator. For this purpose the grid of this tube is connected with condenser 8 through the primary winding 13 of a three winding transformer the secondary winding 14 of which is interposed between the high voltage HT and the plate of said tube, whereas the ternary winding 15 is inserted in the output circuit of this tube. The cathode 16 of the tube 12 is connected with the earth through a condenser 17 and is given a positive bias through resistances 18 and 19.

I might act directly upon the multivibrator connected with the Wehnelt electrodes by means of the signal supplied by tube 12 through winding 15. However, it seems difficult to obtain, with a single stage as above described, a very important frequency division; it therefore seems preferable, for instance in order to obtain a division by about 100, to make use of two similar stages in series. Such an arrangement is shown by Fig. 2, where the signal supplied by the first stage through winding 15 acts upon the grid of a tube 4' similar to tube 4. The signal supplied by tube 4' charges a condenser 8' through condenser 9' and diodes 10' and 11', and so on, indexes ' relating, in the second stage, to elements similar to those having the same reference numerals in the first stage.

Thus, I finally receive through winding 15' a signal of suitably divided frequency, which is applied through a capacitive coupling 20 to the grid of the first tube 21 of a multivibrator. The plate 22 of this tube is connected through a resistance 23 with the high voltage HT, and it is coupled through condenser 24 with the grid of the second tube 25 of the multivibrator. The grids of tubes 21 and 25 are connected respectively with leakage resistances 26 and 27. A common resistance 28 connects with the earth the cathodes of tubes 21 and 25. The plate 29 of tube 25 is connected through resistance 30 with the high voltage HT, and it is coupled with the Wehnelt electrode 1 through condenser 31 and, with the interposition of leakage resistance 32, connected with a source of negative voltage.

Figure 1:
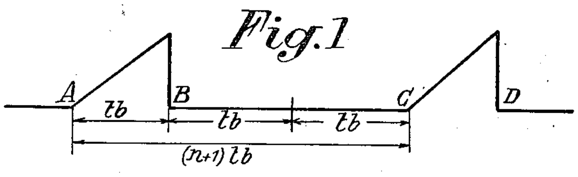
Fig. 1 is a diagram of a scanning according to the invention.

The Wehnelt electrode 1 is thus given through resistance 32 a high negative bias which normally cuts off the current in pickup tube 2, the cathode 33 of which is, on the other hand, earthed. The positive impulse supplied from the multivibrator periodically reduces for a time the negative bias of the Wehnelt electrode, so that a scanning operation can take place during this time. It is thus possible to obtain an intermittent scanning as illustrated by Fig. 1. The voltage delivered by the pickup tube is collected across an output resistor 39.

Concerning the reception of a television transmission effected as above described, it is generally necessary, at least when visual observation is used at the receiver, to provide an image tube the screen of which has a sufficient fluorescent remanence, i. e. one which may be as high as one second and even more. It is unnecessary to provide special scanning means at the receiver since between two frame scanning periods of the pickup tube, the carrier of the transmitter transmits a black level. Of course, the receiver is to include—as any good receiver—an element which reconstitutes the mean shade with a time constant of at least two seconds.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A television transmitter which comprises, in combination, a single pickup tube including a photosensitive target having a substantial capacity of electron accumulation, electron gun means for scanning said target, a Wehnelt device for controlling the beam from said gun, a generator of frame scanning synchronizing signals, at least one frequency divider stage having its input connected with the output of said generator, a generator of relaxation oscillations having its input connected with the output of said frequency divider stage, and means for permanently applying to said Wehnelt device a high negative potential bias, the output of said generator of relaxation oscillations being connected with said Wehnelt device so as periodically to bring it to a potential capable of ensuring the flow of the electron beam, the period of recurrence of said relaxation oscillations being an at least two to one multiple of the frame scanning period, and the duration of each of said oscillations being equal to said frame scanning period.

2. A television transmitter which comprises, in combination, a single pickup tube including a photosensitive target having a substantial capacity of electron accumulation, electron gun means for scanning said target, a Wehnelt device for controlling the beam from said gun, a generator of frame scanning synchronizing signals, at least one frequency divider stage having its input connected with the output of said generator, a generator of relaxation oscillations having its input connected with the output of said frequency divider stage, and means for permanently applying to said Wehnelt device a high negative potential bias, the output of said generator of relaxation oscillations being connected with said Wehnelt device so as periodically to bring it to a potential capable of ensuring the flow of the electron beam, the period of recurrence of said relaxation oscillations being an at least several tens to one multiple of the frame scanning period, and the duration of each of said oscillations being equal to said frame scanning period.

References Cited in the file of this patent

UNITED STATES PATENTS

| | | |
|---|---|---|
| 1,988,931 | Alexanderson | Jan. 22, 1935 |
| 2,107,464 | Zworykin | Feb. 8, 1938 |
| 2,231,829 | Lewis | Feb. 11, 1941 |
| 2,298,863 | Bartelink | Oct. 13, 1942 |
| 2,301,254 | Carnahan | Nov. 10, 1942 |
| 2,402,053 | Kell | June 11, 1946 |
| 2,468,256 | Espley | Apr. 26, 1949 |